United States Patent
Amir et al.

(10) Patent No.: US 9,475,714 B2
(45) Date of Patent: Oct. 25, 2016

(54) METHOD AND SYSTEM FOR TREATING WASTE MATERIAL

(75) Inventors: David Amir, Herzlia (IL); Amir Kleinstern, Kiryat-Ono (IL); Gili Bittan-Banin, Tel-Aviv (IL)

(73) Assignee: Biological Petroleum Cleaning Ltd., Herzlia (IL)

(*) Notice: Subject to any disclaimer, the term of this patent is extended or adjusted under 35 U.S.C. 154(b) by 71 days.

(21) Appl. No.: 14/130,946

(22) PCT Filed: Jul. 4, 2012

(86) PCT No.: PCT/IL2012/050234
§ 371 (c)(1),
(2), (4) Date: Jan. 6, 2014

(87) PCT Pub. No.: WO2013/005212
PCT Pub. Date: Jan. 10, 2013

(65) Prior Publication Data
US 2014/0131274 A1    May 15, 2014

Related U.S. Application Data

(60) Provisional application No. 61/504,264, filed on Jul. 4, 2011.

(51) Int. Cl.
C02F 3/00 (2006.01)
C02F 3/12 (2006.01)
C02F 3/28 (2006.01)

(52) U.S. Cl.
CPC .......... C02F 3/006 (2013.01); C02F 3/121 (2013.01); C02F 3/286 (2013.01); C02F 2209/008 (2013.01); C02F 2209/08 (2013.01); C02F 2209/20 (2013.01); C02F 2209/40 (2013.01); Y02W 10/12 (2015.05); Y02W 10/15 (2015.05)

(58) Field of Classification Search
None
See application file for complete search history.

(56) References Cited

U.S. PATENT DOCUMENTS 3,549,521 A * 12/1970 Stevens ............... C02F 3/006
                                              210/101
5,205,936 A *  4/1993 Topnik ................ C02F 3/006
                                              210/614

(Continued)

FOREIGN PATENT DOCUMENTS

WO    WO 2013/005212    1/2013

OTHER PUBLICATIONS

International Preliminary Report on Patentability Dated Jan. 16, 2014 From the International Bureau of WIPO Re. Application No. PCT/2012/050234.
International Search Report and the Written Opinion Dated Oct. 16, 2012 From the International Searching Authority Re. Application No. PCT/2012/050234.
Barashy "BioPetroClean—Industrial Wastewater Treatment", BPC, Simplicity in Action, Youtube-Movie, Retrieved From the Internet, Oct. 29, 2008. Min.1:44-1:54, 2:18, 3:40-3:48.

(Continued)

Primary Examiner — Chester Barry

(57) ABSTRACT

A method of treating wastewater in a wastewater treatment system is disclosed. The wastewater treatment system receives an influent of the wastewater and having at least a first bioreactor and a second bioreactor each having therein bacteria for treating the waste material. The method comprises: monitoring a load parameter being indicative of a load on the second bioreactor; responsively to a monitored value of the load parameter, controlling at least one flow rate selected from the group consisting of (i) a flow rate from the influent to the second bioreactor through the first bioreactor, and (ii) a flow rate from the influent directly to the second bioreactor, so as to maintain a generally constant and predetermined load on the second bioreactor.

27 Claims, 13 Drawing Sheets

(56) References Cited

U.S. PATENT DOCUMENTS

| | | | | |
|---|---|---|---|---|
| 5,639,371 | A | * | 6/1997 | Loy .................. C02F 3/006 210/104 |
| 5,902,484 | A | * | 5/1999 | Timpany ............. C02F 3/006 210/621 |
| 6,383,370 | B1 | | 5/2002 | Keever et al. |
| 6,383,389 | B1 | * | 5/2002 | Pilgram ............. C02F 3/006 210/110 |
| 2008/0308493 | A1 | | 12/2008 | Amir et al. |

OTHER PUBLICATIONS

Hirshberg "Upset Prevention in Biological Water Treatment Facilities", Industrial Waste Water Treatment, World Water, p. 35-36, Jul./Aug. 2010.

Sipma et al. "Biotreatment of Industrial Wastewater Under Transient-State Conditions: Process Stability With Fluctuations of Organic Load, Substrates, Toxicants, and Environmental Parameters", Critical Reviews in Environmental Science and Technology, 40(2): 147-197, 2010.

* cited by examiner

FIG. 4A
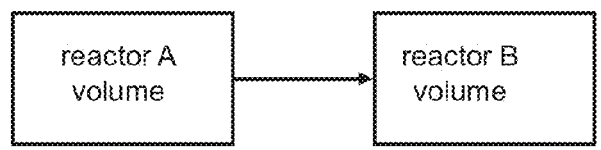
FIG. 4B
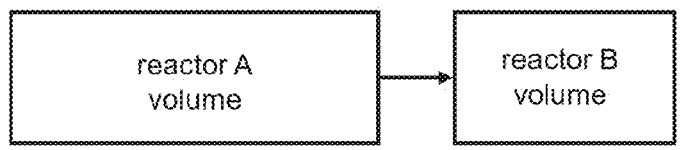
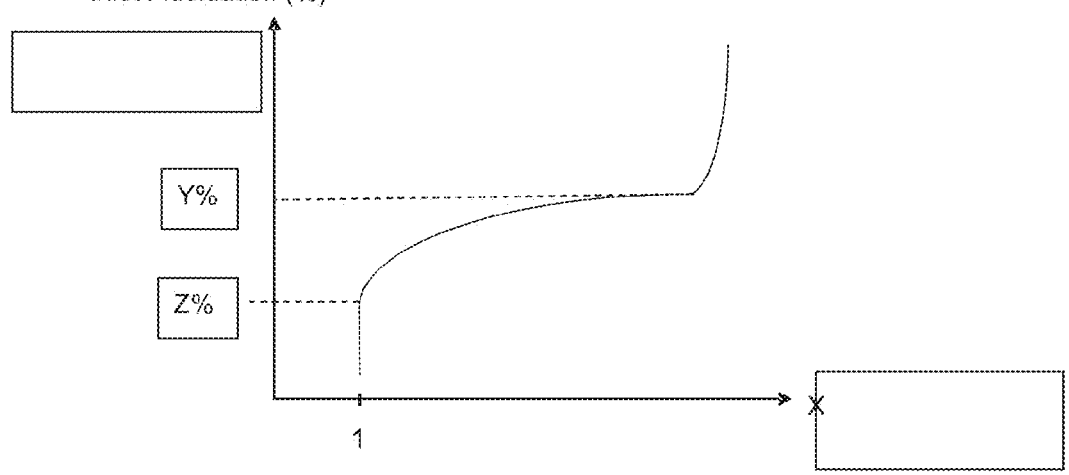
FIG. 5

METHOD AND SYSTEM FOR TREATING WASTE MATERIAL

RELATED APPLICATIONS

This application is a National Phase of PCT Patent Application No. PCT/IL2012/050234 having International filing date of Jul. 4,2012, which under 35 USC §119(e) of priority to U.S. Provisional Patent Application No. 61/504, 264 filed Jul. 4, 2011. The contents of the above applications are incorporated herein by reference in their entirety.

FIELD AND BACKGROUND OF THE INVENTION

The present invention, in some embodiments thereof, relates to waste material treatment and, more particularly, but not exclusively, to treatment of waste material using at least two bioreactors.

A large amount of interest in treatment of municipal and industrial wastewaters has arisen as a result of environmental pollution concerns. Often in treatment of wastewater from industrial and municipal sources, the activated sludge process is employed for treatment and purification.

The biological treatment process takes advantage of the ability of bacteria to use wastewater constituents to provide the energy for microbial metabolism and the building blocks for cell synthesis. The metabolic activity removes contaminants from the wastewater. The process generally consists of maintaining an aeration basin in which wastewater is fed to a suspension of bacteria to form a mixed liquor. The mixed liquor is aerated to furnish oxygen for the respiration of the biomass which assimilates and metabolizes the biological oxygen demand of the wastewater. After a suitable period of aeration, the mixed liquor is introduced to a clarifier in which the biomass settles and the treated wastewater overflows into a receiving stream. A portion of the settled biomass, which is concentrated at the bottom of the clarifier, is recycled to the aeration basin, and a portion is purged in order to maintain a desired biosolids inventory within the system (e.g. based on F/M).

Variations in flow rates, organic (e.g. phenols) or non-organic (e.g. salinity) concentrations or other conditions cause fluctuations in influent wastewater quality and quantity e.g. contamination level. In particular, certain industrial events can result in the loading of an organic or non-organic shock pollutant load into the treated wastewater collection system. Such shock loading can upset the balance of the microbial culture in the process with a resulting loss of wastewater treatment effectiveness. Following an upset a prolonged period of several weeks or even months is required to bring the system back to steady-state operations.

Numerous techniques have been proposed for improving the activated sludge process, these include U.S. Pat. Nos. 6,555,002, 5,646,863, 5,779,911, 6,023,223, 6,596,171 and 6,625,569; and Leu et al., 2009, "Modeling the Performance of Hazardous Wastes Removal in Bioaugmented Activated Sludge Processes," Water Environment Research, 81, 11, 2309-2319.

SUMMARY OF THE INVENTION

According to some embodiments of the invention the present invention there is provided a method of treating wastewater in a wastewater treatment system receiving an influent of the wastewater and having at least a first Automated Chemostat Treatment (ACT) bioreactor and a second bioreactor each having therein bacteria for treating the waste material. The method comprises: monitoring a load parameter being indicative of a load on the second bioreactor; responsively to a monitored value of the load parameter, controlling at least one flow rate selected from the group consisting of (i) a flow rate from the influent to the second bioreactor through the first bioreactor, and (ii) a flow rate from the influent directly to the second bioreactor, so as to maintain a generally constant and predetermined load on the second bioreactor.

According to an aspect of some embodiments of the present invention there is provided a wastewater treatment system. The system comprises: a wastewater inlet for receiving an influent of wastewater; at least a first Automated Chemostat Treatment (ACT) bioreactor and a second bioreactor each having therein bacteria for treating the wastewater, the bioreactors being in fluid communication with the inlet and thereamongst; a monitoring unit configured for monitoring a load parameter being indicative of a load on the second bioreactor; and a controller configured for controlling, responsively to a monitored value of the load parameter, at least one flow rate selected from the group consisting of (i) a flow rate from the influent to the second bioreactor through the first bioreactor, and (ii) a flow rate from the influent directly to the second bioreactor, so as to maintain a generally constant and predetermined load on the second bioreactor.

According to some embodiments of the present invention the second bioreactor is selected from the group consisting of: an ACT, a sequential batch reactor, a membrane bioreactor, an activated sludge reactor and a moving bed bioreactor.

According to an aspect of some embodiments of the present invention there is provided a method of treating a waste material in a waste material treatment system receiving an influent of the waste material and having at least a first bioreactor and a second bioreactor each having therein bacteria for treating the waste material. The method comprises: monitoring a load parameter at least in the influent; and responsively to a monitored value of the load parameter, controlling at least one flow rate selected to from the group consisting of (i) a flow rate from the influent to the second bioreactor through the first bioreactor, and (ii) a flow rate from the influent directly to the second bioreactor.

According to an aspect of some embodiments of the present invention there is provided a waste material treatment system. the system comprises: a waste material inlet for receiving an influent of waste material; at least a first bioreactor and a second bioreactor each having therein bacteria for treating the waste material; a monitoring unit configured for monitoring a load parameter at least in the influent; and a controller configured for controlling, responsively to a monitored value of the load parameter, at least one flow rate selected from the group consisting of (i) a flow rate from the influent to the second bioreactor through the first bioreactor, and (ii) a flow rate from the influent directly to the second bioreactor.

According to some embodiments of the present invention each of the first and the second bioreactors is independently selected from the group consisting of: an automated chemostat, a sequential batch reactor, a membrane bioreactor, an activated sludge reactor and a moving bed bioreactor.

According to some embodiments of the present invention the first bioreactor is an automated chemostat.

According to some embodiments of the present invention the first bioreactor is other than an automated chemostat.

According to some embodiments of the present invention the control over the flow rates is performed without changing the flow rate in the influent.

According to various exemplary embodiments of the present invention if the monitored value is outside a predetermined range, then the flow rate from the influent directly to the second bioreactor is reduced.

According to some embodiments of the present invention the control over the flow rates is performed so as to maintain a generally constant and predetermined waste material load in the second bioreactor.

According to some embodiments of the present invention the control over the flow rates is performed so as to maintain a generally constant and predetermined waste material load in the first bioreactor.

According to some embodiments of the present invention the generally constant and predetermined waste material load is selected such as to maintain a total degradation of at least one parameter selected from the group consisting of Chemical Oxygen Demand and Total Organic Carbon which is below a predetermined threshold.

According to some embodiments of the present invention the generally constant and predetermined waste material load is selected such as to maintain a global sludge yield which is below a predetermined threshold.

According to some embodiments of the present invention at least one of the first bioreactor and the second bioreactor is at aerobic conditions.

According to some embodiments of the present invention at least one of the first bioreactor and the second bioreactor is at anaerobic conditions.

According to some embodiments of the present invention the monitoring is performed on-line.

According to some embodiments of the present invention the monitoring is performed off-line.

According to some embodiments of the present invention the load parameter is calculated based on a waste material load in the influent and a waste material load on the second bioreactor as measured from data collected from a flow of waste material directed from the first to the second bioreactor.

According to some embodiments of the invention the load parameter is a linear combination of the waste material loads.

According to some embodiments of the present invention the waste material load on the second bioreactor is indicative of the biodegradable capability of the second bioreactor.

According to some embodiments of the invention the waste material load on the second bioreactor is calculated using statistical analysis applied on historical data collected from the second bioreactor.

According to some embodiments of the present invention each of the waste material loads is independently calculated using at least one monitored parameter selected from the group consisting of at least one parameter selected from the group consisting of chemical oxygen demand (COD), dissolved oxygen (DO), oxygen uptake rate (OUR), pH, temperature, total petroleum hydrocarbons (TPH), biochemical oxygen demand (BOD), total organic carbon (TOC), non-purgable organic carbon (NPOC), total suspended solids (TSS), turbidity, conductivity, chloride concentration, salinity, total nitrogen, ammonia, ammonium, nitrite, nitrate, $N_2$, total phosphate, $PO_4$ (orthophosphate), oxidised & ortho phosphorus (OOP), poly-phosphates, sulfide, sulfate, phenol, MTBE, detergent, poly aromatic hydrocarbons (PAH), cresol, detergents, volatile suspended solids (VSS), $CO_2$ (air and/or water), cyanide, total carbon (TC), total inorganic carbon (TIC), oil and grease, optical absorbance, and any combination thereof.

According to some embodiments of the present invention the waste material is wastewater.

According to some embodiments of the present invention the inlet is characterized by average content fluctuations of less than Z % wherein Z<100 and wherein a volume of the first bioreactor is not larger than a volume of the second bioreactor.

According to some embodiments of the present invention the inlet is characterized by average content fluctuations of more than Z % wherein Z<100 and wherein a volume of the first bioreactor is larger than a volume of the second bioreactor.

According to an aspect of some embodiments of the present invention there is provided a method of improving a waste material treatment system receiving an influent of the waste material into a bioreactor B. The method comprises obtaining expected content fluctuations of waste material in the influent; providing a bioreactor A wherein a volume of the first bioreactor A is larger than a volume of the bioreactor B if and only if the expected content fluctuations is above Z %, wherein Z<100; deploying the bioreactor A such as to establish a controllable fluid communication between the bioreactor A and the influent, a controllable fluid communication between the bioreactor B and the influent, and a fluid communication from the bioreactor A to the bioreactor B; positioning a monitoring unit configured for monitoring a load parameter at least in the influent; and positioning a controller configured for controlling, responsively to a monitored value of the load parameter, flow rates (i) from the influent to the second bioreactor through the first bioreactor, and (ii) from the influent directly to the second bioreactor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A and 4B are schematic illustration of a scenario with low fluctuations in the main influent (FIG. 4A) and high fluctuations in the main influent (FIG. 4B);

FIG. 5 is a graph which schematically shows the relation between the volumetric capacity ratio X and the expected inlet fluctuations;

DESCRIPTION OF SPECIFIC EMBODIMENTS OF THE INVENTION

Figure 1:
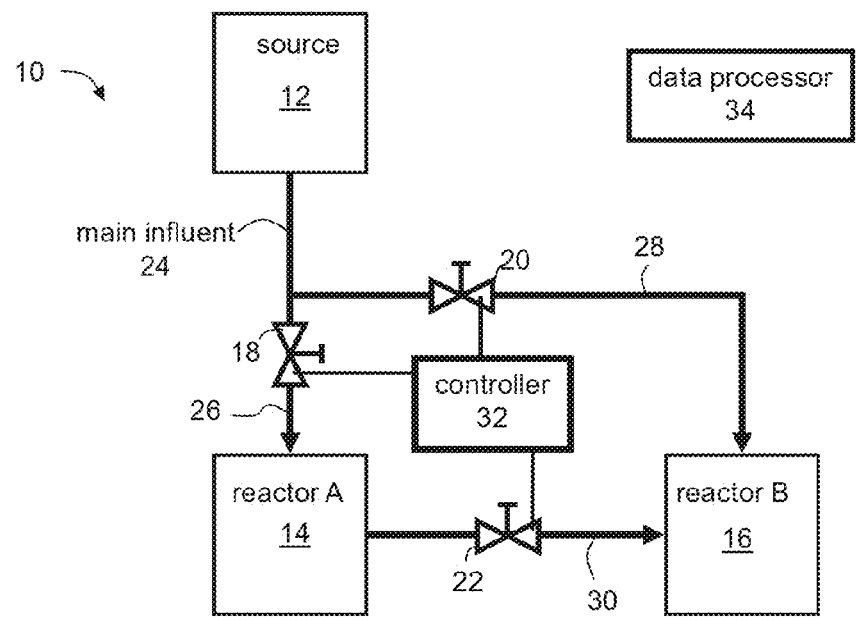
FIG. 1 is a schematic illustration of a wastewater treatment system, according to some embodiments of the present invention.

The present invention, in some embodiments thereof, relates to waste material to treatment and, more particularly, but not exclusively, to treatment of waste material using at least two bioreactors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Bioremediation for waste material treatment is a very effective method to remove the organic compounds from water. Yet, in bioremediation, it is oftentimes difficult to keep stabilized performance when the inlet chemical oxygen demand (COD) or and/or total organic carbon (TOC) fluctuates. The nature of the waste material is that its COD and/or TOC levels fluctuate and sometimes by 100% or even more. Since high fluctuations may cause a condition referred to as "bacteria upset" (or "upset") in which the bioreactor goes out of balance.

An upset is defined as any abnormal conditions, anomalies or interruptions in the treatment process or the distribution system that may reduce the quality of treatment and consequently the quality of the treated material at the outlet of the system. In some cases, upset includes collapse of the bio-system as a result of instability in the biological process due to fluctuations in the influent content. Several techniques have been devised to avoid such upset. These include: (i) use of multiple barriers wherein some primary processes (e.g., gravitational separation, chemical precipitation) are employed before introducing the waste material into bioreactor so as to avoid free and suspended oil and to reduce the organic loads and keep the reactor in balance, (ii) use large equalizing tanks for mix all streams and create a homogenous inlet stream, (iii) store different streams in different inlet tanks and feed the reactor with a combined stream that has certain percentage of each stream, and (iv) monitoring the TOC or COD level and reduce the flow when the inlet TOC or COD goes higher.

It was found by the present inventors that the above methods, although being helpful, they are not without certain operative limitations that would best be avoided. For example, it was found by the preset inventors that these techniques add operational and capital cost to the effluent treatment path. It was found by the preset inventors that the above techniques are inadequate for producing sufficient stability and/or quality, so that post treatment has to be used extensively to compensate for the resulted instability.

The present assignee developed a bioremediation process for waste water treatment, referred to as an Automated Chemostat Treatment (ACT), to this end see, e.g., U.S. Pat. No. 8,038,881, the contents of which are hereby incorporated by reference.

The ACT is based on a chemostat reactor, which is a bioreactor to which fresh medium is continuously added, while culture liquid is continuously removed so as to keep the culture volume generally constant. A stirred bioreactor can operate as a chemostat, with continuous inflow and outflow, wherein the inflow is controlled to keep the culture volume generally constant. By varying the rate with which the medium (for example, carbon source) is added to the chemostat, the growth rate of the microorganism is controlled. If, for example, the carbon concentration in the chemostat is increased then the bacterial concentration is increased to a point of steady state. Thus, the carbon concentration is a proxy to the bacterial concentration.

Generally, in activated sludge reactors a portion of the bacteria is recycled back to the process after settling in the clarifier. The amount of sludge that is recycled back into the reactor is selected so as to maintain a constant Food to Mass ratio (also referred to as "F to M ratio"). However, when there is an abrupt rise in F, it is difficult to maintain the F to M ratio constant, since, e.g., F becomes too high to be compensated by the recycled biomass. The present inventors found that there are situations in which the increment in F is so high that even if the entire biomass is recycled back from the clarifier, the F to M ratio is still not restored. The difference between ACT reactors and activated sludge reactors is that sludge recycling is not required and usually not employed in ACT reactors.

The ACT is a flexible and simple process that can be adopted for different applications and can be justified for small or large flows. The ACT provides process stability by monitoring and control, has shown good response to organic shock loads, and is capable of processing high organic loads. The ACT can therefore serve as a first stage bio treatment to reduce organic loads and optionally reduce or remove system bottlenecks, organic shock loads and toxic pollutants. The ACT is advantageous also because it has a relatively low sludge yield, hence providing a lower operational to expenditure (OPEX).

Demonstration of ACT response to organic shock loads is presented in the Examples section that follows (see FIGS. 6A-C in Example 2) which describe data from pilot in which the ACT system was fed with highly fluctuated waste-water. By flow control, the ACT was stabilized particularly in comparison to the inlet fluctuations rate and biological systems.

The present inventors found that the above techniques are applicable in situations in which the flow can be adjusted in real time. Typically, sites having sufficient buffer tanks that can absorb the water during the transition period (e.g., 24 hours or more) can employ this technique. The present inventors also found that the above techniques are less preferred for sites in which the buffer tanks are small or when it is not desired to control the flow.

The present inventors have devised a technique for controlling the load feed substantially without changing the main flow generated by the industrial or municipal source.

Some embodiments of the present invention are schematically illustrated in FIG. 1, which shows a system 10 having two or more reactors employed in a serial and parallel configuration.

As used herein "serial configuration" refers to a configuration in which the outlet of one reactor is connected to the inlet of another reactor.

As used herein "parallel configuration" refers to a configuration in which the inlets of two or more reactors are connected to the same outlet or fluid source, such that a portion of the fluid from the outlet or fluid source flows into the inlet of one reactor, while another portion of the fluid from the outlet or fluid source flows into the inlet of the other reactor.

In various exemplary embodiments of the invention the waste material received by the reactors is wastewater and the reactors are adapted for treating wastewater. In various exemplary embodiments of the invention at least one of the reactors is a bioreactor. In some embodiments, all the interconnected reactors are bioreactor.

As used herein, "bioreactor" refers to a reactor capable of treating waste material via biological remediation process, featured by organisms, microorganisms, bacteria and the like.

The bioreactor of the present embodiments can be at aerobic or anaerobic conditions, as desired. Representative examples of bioreactors suitable for the present embodiments include, without limitation, automated chemostat, activated sludge (AS), membrane bioreactor (MBR), sequential batch reactor (SBR), Moving Bed Bioreactor (MBBR) and the like.

In the schematic illustration shown in FIG. 1, system 10 comprises two reactors reactor A shown at 14 and reactor B shown at 16, but a system including more than two reactors is not excluded from the scope of the present invention. In various exemplary embodiments of the invention at least two of the reactors are arranged to be fed directly from an influent 24 provided by an industrial or municipal source 12 and at least one of these reactors, e.g., reactor B is also arranged to be fed by the other reactor, e.g., reactor A. In various exemplary embodiments of the invention at least one of the reactors is fed in a selective manner.

As used herein, "selective feeding" means feeding at a controllable flow rate.

In some embodiments of the present invention, the direct feeding of both reactors 14 and 16 from source 12 is selective. Optionally, reactor 16 is fed by reactor 14 in selective manner.

Thus, according to the present embodiments, there are fluid communication lines from source 12 to reactor 14, from source 12 to reactor 16 and from reactor 14 to reactor 16. These fluid communication lines are designated 26, 28 and 30, respectively.

The selectivity in feeding can be achieved using one or more controllable valves mounted on the respective fluid communication lines. For example, the communication line between source 12 and reactor 14 (line 26) can be provided with a controllable valve 18. Alternatively or additionally, the communication line between source 12 and reactor 16 (line 28) can be provided with a controllable valve 20. While the present Inventors contemplate use of both controllable valves 18 and 20, this need not necessarily be the case since the use of one of these valves affects the flow into both reactors. For example, when valve 18 is present in line 26 but line 28 is devoid of valves, a change in the flow within line 26 also effects an opposite change in the flow within line 28, e.g., by virtue of mass conservation.

Optionally, the communication line between reactor 14 and reactor 16 (line 30) is also provided with a valve 22, but this need not necessarily be the case since the flow to rate from reactor 14 to reactor 16 is effectively controlled by valve 18.

System 10 comprises a controller 32 which is configured to control the valves, as further detailed hereinbelow. For example, controller 32 can communicate with a data processor 34 such as a general purpose computer or dedicated circuitry configured for operating controller 32 based on a waste material flow protocol. The data processor can access a computer readable medium comprising computer program in the form of computer readable instructions for operating controller 32.

The flow in all communication lines can be established by any means, including the use of pumps and/or gravity. In particular, the flow from reactor 14 to reactor 16 can be maintained by gravity.

In various exemplary embodiments of the invention at least one of the reactors is an ACT bioreactor. Preferably, the reactor whose inlet is connected to the source and whose outlet is connected to the inlet of another reactor is an ACT bioreactor. In the schematic and non-limiting illustration of FIG. 1, this embodiment corresponds to a configuration in which reactor 14 is an ACT bioreactor. The advantage of this embodiment is that an ACT bioreactor can digest high COD loads and can therefore function adequately even under relatively high fluctuation in influent wastewater quality and quantity. Thus, the use of an ACT bioreactor as the feeder for the other reactor helps reduce significant amount of the COD load and feed the other reactor (reactor 16 in the present example) with lower or constant COD and/or organic loads this keeps it generally in balance and reduces or eliminates the risk for biological upsets.

Reactor(s) further downstream reactor 14 are optionally, but not necessarily, bioreactors other than an ACT bioreactor. The advantage of using a bioreactor other than an ACT bioreactor is that it allows handling low and constant COD loads since it may be efficient in long bacterial retention time. In some embodiments reactor 14 is an ACT bioreactor and reactor 16 is AS. Other combinations of reactor types are not excluded from the scope of the present invention.

There are many advantages to the combination of a chemostat reactor (e.g., ACT bioreactor) and a bioreactor other than chemostat (e.g., AS bioreactor).

One advantage relates to the stability of the waste material treatment. System 10 provides stability and reduces or eliminate the risk of bacteria upsets, since the chemostat reactor can react to fluctuations by adjusting the process conditions such as to air and nutrients fed so as to attenuate the high COD and ensure generally constant feed to the second reactor.

Another advantage relates to the sludge yield. System 10 has a significantly reduced sludge yield, since the majority of the COD (namely, more than half) is reduced in the chemostat reactor that produces lower sludge yield than other types of reactors, and the minor part of the COD (namely, less than half) is reduced in the other reactor with higher sludge yield.

An additional advantage relates to the maintenance of efficiency. When the main influent includes low COD, the second reactor becomes more dominant and provides the benefit of efficient process with generally constant output quality. Furthermore, since the second reactor receive relatively low and constant load, there is enrichment in the bacteria that efficiently digest low TOC concentration.

The volumetric capacity ratio (or, equivalently, characteristic retention time ratio) between reactors 14 and 16 may vary, depending on the expected conditions in the main influent 24 and on the type of reactors. Thus, for example, for a given volumetric capacity or characteristic retention time of reactor 16, the volumetric capacity or characteristic retention time of reactor 14 may be selected based on the expected conditions in the main influent 24.

Specifically, the reactor that is capable of treating the expected influent is preferably with the higher capacity. For example, suppose that the first reactor 14 is capable of handling waste material with high fluctuations in degradable content and (e.g., an ACT bioreactor) and the second reactor 16 has higher treatment efficiency for waste water with generally constant degradable content (e.g., an AS bioreactor). In this embodiment, the capacity ratio or characteristic retention time ratio between the first and second reactors preferably correlates to the expected fluctuations in the main influent 24. Specifically, denoting the average content fluctuations characterizing the main influent 24 by $\Delta$ (Delta), when $\Delta$ is less than or equals Z % the volumetric capacity of the first reactor 14 is not larger than that of the second bioreactor 16, and when $\Delta$ is above Z % the volumetric capacity of the first reactor 14 is larger than that of the second bioreactor 16, where Z is a predetermined fluctuation threshold, $0<Z<100$.

In various exemplary embodiments of the invention controller 32 operates the valves such as to ensure a generally constant (within a predetermined tolerance of, for example, less than 20% or less than 10% or less than 5%) load for at least one of the reactors. For example, the valves can be controlled such as to ensure a generally constant load for the second reactor (reactor 16, in the present example).

The generally constant load can be achieved by monitoring a load parameter being indicative of a load on the respective reactor, and controlling the flow rates responsively to the monitored value. The load parameter can be monitored on-line or off-line, as desired.

In various exemplary embodiments of the invention the load parameter is indicative of the organic load on the respective reactor. The load parameter can also be indicative of the biodegradable capability of the respective bioreactor. The advantage of this type of load parameter is that the load estimation is more accurate when non biodegradable material in the effluent is not considered during the calculation. In various exemplary embodiments of the invention valve(s) is/are controlled such as to ensure a general constant biodegradable load.

Biodegradation rates of wastewater contaminants may be different between different sites. The source of these variations may be due to the nature of the contaminant. While some organic sources have high biodegradation rate, other may have low biodegradation rate. The biodegradation rate is affected by many factors including, temperature, pH, different fluctuations in the water inlet, fluctuation in the ratio of organic to non-organic compounds and presence of toxic materials.

In various exemplary embodiments of the invention the valves are controlled such as to ensure a generally constant biodegradation percentage (e.g., about 80% or 85% or about 90%) in the second reactor (reactor 16, in the present example). In some embodiments, are controlled such as to ensure that the remaining Total Organic Carbon (TOC) in the second reactor is below a predetermined TOC percentage thresholds (e.g., below 20% or below 15% or below 10%) at all times.

The load parameter can be calculated based on a waste material load as measured at any location or multiple locations along the waste material path within system 10. Typically, the load is measured at or before the inlet of the respective reactor. For example, in embodiments in which it is desired to monitor the load on reactor 16, the load parameter is optionally and preferably calculated based on a waste material load as measured from data collected from a flow of waste material within influent 24 (or, equivalently, line 28) and a waste material load as measured from data collected from a flow of waste material within line 30 from reactor 14 to reactor 16. The load parameter can be any combination of these waste material loads. For example, the load parameter can be a linear combination of the measured waste material loads.

The waste material load can also be calculated using statistical analysis applied on history data collected from the reactor.

The waste material load(s) can be calculated using one or more monitored parameter selected from the group consisting of chemical oxygen demand (COD), dissolved oxygen (DO), oxygen uptake rate (OUR), pH, temperature, total petroleum hydrocarbons (TPH), biochemical oxygen demand (BOD), total organic carbon (TOC), non-purgable organic carbon (NPOC), total suspended solids (TSS), turbidity, conductivity, chloride concentration, salinity, total nitrogen, ammonia, ammonium, nitrite, nitrate, $N_2$, total phosphate, $PO_4$ (orthophosphate), oxidised & ortho phosphorus (OOP), poly-phosphates, sulfide, sulfate, phenol, MTBE, detergent, poly aromatic hydrocarbons (PAH), cresol, detergents, volatile suspended solids (VSS), $CO_2$ (air and/or water), cyanide, total carbon (TC), total inorganic carbon (TIC), oil and grease, optical absorbance, and any combination thereof.

For example, organic load can be calculated by a multiplication of the COD by the flow rate. When BOD is measured, it can be indicative for the amount of non-biodegraded material that is present. However, it is appreciated by the present inventors that direct measurement of BOD is not always possible. In such cases, the estimation of on biodegradable capability is preferably based on statistical analysis. For example, data processor 34 can accumulate the BOD measurements and performance over time and employ a waste material flow algorithm for repeatedly updating the waste material flow protocol based on the accumulated measurements and performances. BOD can also be estimated based on combination of parameters, such as, but not limited to, OUR, TOC and COD.

Data processor 34 can also receive history data from external source or from the operator and employ the waste material flow algorithm to update the waste material flow protocol based on the received history data.

Data processor 34 can also receive laboratory test results, or data arriving from to real-time databases of information collected at the facility at which the system is deployed. Also contemplated, are data obtained by simulations. The simulation data can be obtained during laboratory simulations, field simulations and/or pilot-scaled simulations, as desired. Additionally, the method can receive data processor 34 can discrete or non numeric data such as an indication that a sludge pump is operating or sludge level is rising. In some embodiments, data processor 34 receives data other than an instrument reading or test result, such as an operator voice record or a plant camera video input. Any of the received data can be complied by data processor 34 receives and used for updating the waste material flow protocol.

The statistical analysis performed by processor 34 can include calculation of a statistical distribution for each of the monitored parameters to provide a set of statistical distributions characterizing the load. Also contemplated, are embodiments in which the load is characterized by a score calculated using the monitored parameters. The score can be calculated using a predetermined relation between the score and each of various parameters. The score can also be calculated statistically, for example, by calculating statistical distribution for the respective parameters and combining the statistical distributions to provide the score. It is appreciated by the present inventors that a combination of multiple parameters allows predicting cause and affect relationships.

In some embodiments of the present invention the relation between the score and the parameters is updated adaptively, preferably using history data from previous measurements or data obtained from other sites in the same facility or other facilities. For example, an artificial neural network algorithm can be employed for calculating the score for any set of parameters based on the measured value of the parameters and on history data. The artificial neural network algorithm can access the database and learn the data over time and develop strategies to handle future problems and operation conditions that appear similar to or related to past problems and operational conditions. The neural network algorithm can evaluate the incoming process data, including facility operation data and environmental data, to determine incoming noise, data gaps, data equality, errors and failures of hardware sensors that may have occurred. The neural network algorithm can also use history information, data manipulation, data averaging, data from other sensors or the like. In some embodiments of the present invention the neural network algorithm can employ pattern recognition for searching the incoming to data to find matches with previous data and operational modes (or predicted data where no prior data exists) to locate patterns that are recognized as possibly leading to upsets.

The neural network algorithm preferably provides values for missing data and eliminating erroneous data. Based on the resulting modified data the data processor can update the waste material flow protocol.

It is expected that during the life of a patent maturing from this application many relevant data analysis techniques will be developed and the scope of the term data analysis is intended to include all such new technologies a priori.

The data processor updates the flow protocol such as to maintain a generally constant load on one or more of the reactor. Suppose, for example, that the data received by data processor indicates that the load on reactor 16 is temporarily reduced. In this case, the data processor preferable signals controller 32 to increase the flow in line 28 into reactor 16 and reduce the flow in line 26 to reactor 14, hence to increase the load. Conversely, suppose that the data received by data processor indicates that the load on reactor 16 is temporarily increased. In this case, the data processor preferable signals controller 32 to reduce the flow in line 28 and increase the flow in line 26. In various exemplary embodiments of the invention the flow rate in the main influent 24 is not changed as a result of the valve operations. In some embodiments, the flow rate in the main influent 24 can remain generally constant (within a predetermined tolerance of less than 20% or less than 10% or less than 5% or less) at all times.

Figure 2:
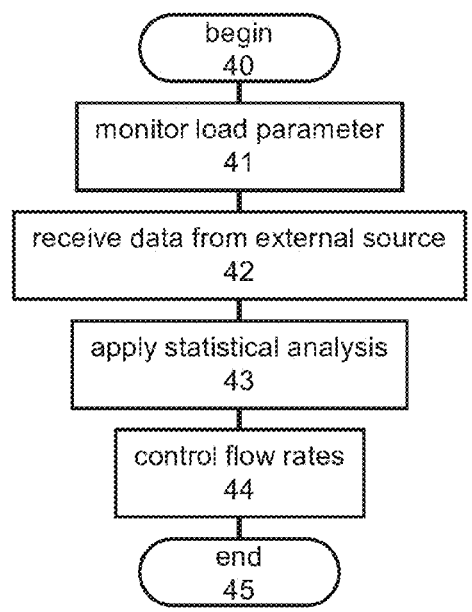
FIG. 2 is a flowchart diagram of a method suitable for treating a waste material according to some embodiments of the present invention.

Reference is now made to FIG. 2 which is a flowchart diagram of a method suitable for treating a waste material according to some embodiments of the present invention. The method is particularly useful for use in a waste material treatment system receiving an influent of the waste material and having at least a first reactor and a second reactor, such as, but not limited to, system 10. At least some of the operations of the method are executed by a data processor such as a general purpose computer or dedicated circuitry.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, to can be executed in a different order (e.g., a reverse order) or substantially contemporaneously. Additionally, several operations described below are optional and may not be executed.

The method begins at 40 and continues to 41 at which a load parameter is monitored at one or more locations along the waste material path within the waste material treatment system, as further detailed hereinabove. Optionally the method continues to 42 at which data from external source is received. The data from external source can be any type of data, including, without limitation, history data, data pertaining to laboratory test results, data arriving from real-time databases of information collected at the facility at which the system is deployed, data obtained by simulations and the like.

The method optionally and preferably continues to 43 at which the method applies statistical analysis to the monitored parameter and optionally also to data received from external source, as further detailed hereinabove.

The method proceeds to 44 at which the flow rates from the influent to the second reactor through the first bioreactor, and the flow rates from the influent directly to the second bioreactor are controlled responsively to the monitored parameter or the results of the analysis, as further detailed hereinabove.

The method ends as 45.

Figure 3:
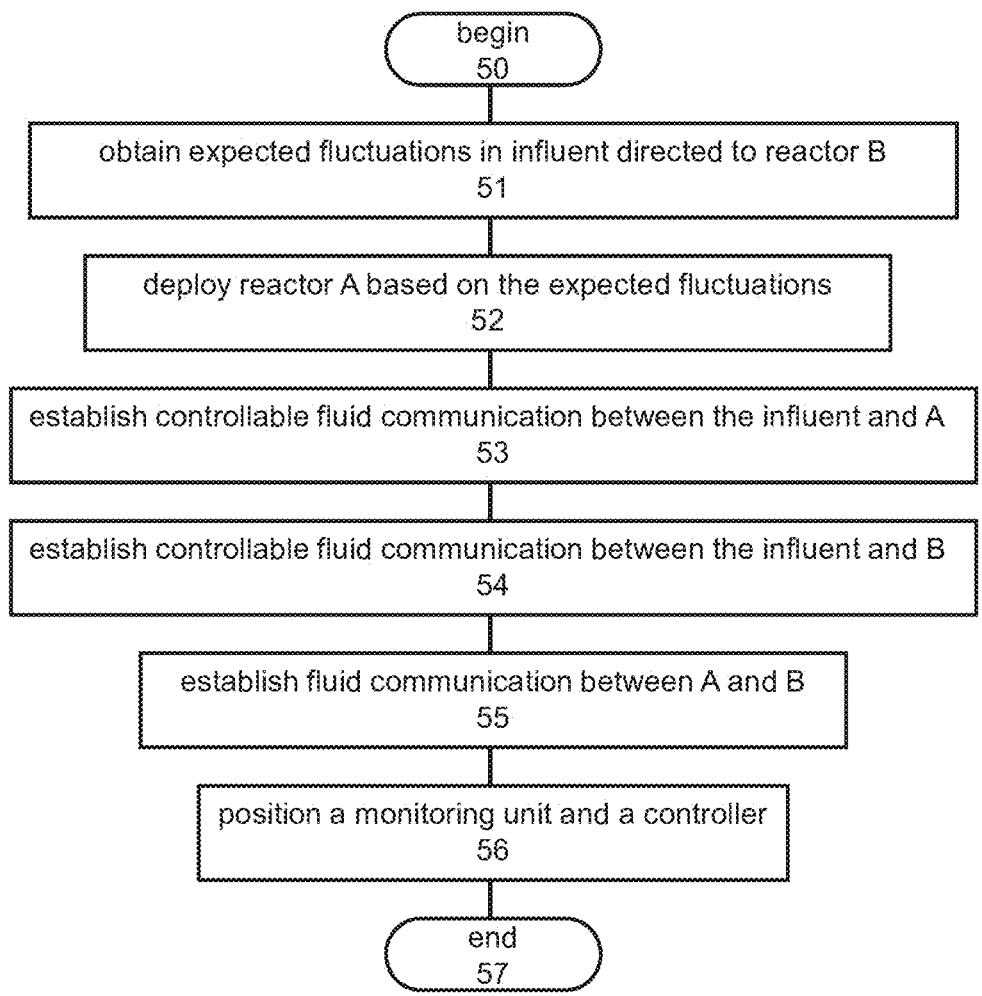
FIG. 3 is a flowchart diagram of a method suitable for improving a waste material treatment system, according to some embodiments of the present invention.

Reference is now made to FIG. 3 which is a flowchart diagram of a method suitable for improving a waste material treatment system, according to some embodiments of the present invention. The waste material treatment system receives an influent of the waste material into a reactor B (e.g., a bioreactor, such as, but not limited to, a bioreactor other than an ACT bioreactor).

The method begins at 50 and continues to 51 at which an expected content fluctuations Δ—of waste material in the influent is received. The method continues to 52 at which a reactor A is provided and deployed at the site of the waste material treatment system. Reactor A can be a bioreactor, optionally and preferably an ACT bioreactor. In various exemplary embodiments of the invention the volumetric capacitance of reactor A is larger than the volumetric capacitance of reactor B if and only if Δ—is above Z %, as further detailed hereinabove. Thus, in these embodiments if Δ—is not above Z %, then the volumetric capacitance of reactor A is not larger than the volumetric capacitance of reactor. In some embodiments of the present invention when Δ—exceed a second predetermined threshold Y (Y>Z) then the volumetric capacitance of reactor B is set to a predetermined minimum volume.

The method continues to 53, 54 and 55 (at any order of execution) at which the method establishes a controllable fluid communication between reactor A and the influent (53), a controllable fluid communication between reactor B and the influent (54), and a fluid communication from reactor A to reactor B (55). Optionally, but not necessarily, the fluid communication from reactor A to reactor B is also controllable.

The method continues to 56 at which a monitoring unit and a controller are positioned. The monitoring unit is configured for monitoring a load parameter at least in the influent and the controller is configured for controlling the flow rates as further detailed hereinabove.

The method ends as 57.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at to least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Exemplary Calculations Algorithm

The present inventors devised a technique which, in some embodiments, keeps the organic load generally constant and therefore keep the bioreactor performance substantially stable, even when the inlet load (particularly the contamination level) fluctuates by hundreds of percents, optionally and preferably without changing the inlet flow. The technique according to some embodiments of the present invention allows keeping constant organic load (within certain tolerances) on the second bioreactor.

For any measurable parameter P that correlates to the load, the following quantities can be defined:

$P_{in}$=parameter level at the main influent 24; and $P_A$=parameter level at line 30 (the output of reactor A).

P can be, for example, COD, TOC and the like. Thus, when P is COD, $P_{in}$ is the COD level (for example, mass COD per wastewater volume, typically expressed in units of mg/l) at the main influent 24, and $P_A$ is the COD level at line 30; and when $P_{in}$ is the TOC level (for example, mass TOC per wastewater volume, typically expressed in units of mg/l) at the main influent 24, and $P_A$ is the TOC level at line 30.

The flow rates in main influent 24 and fluid communication lines 26, 28 and 30 are referred to below as $Q_T$, $Q_A$, $Q_B$ and $Q_{AB}$, respectively. Typically, $Q_T=Q_A+Q_B$. In the present example, $Q_T$ remains constant at all times.

The total load and loads on reactors A and B can be calculated as follows:

$$\text{Load } A = P_{in} \times Q_A;$$

$$\text{Load } B = P_{in} \times Q_B + P_A \times Q_{AB}; \text{ and}$$

$$\text{Total Load} = P_{in} \times Q_T.$$

The second term in Load B above expresses the partial load on B that results from the flow of waste material from A to B. This partial load is referred to below as "Load AB."

In the present example the flow rates in lines 26 and 28 are controlled so as to maintain a generally constant level for Load B, within a predetermined tolerance of less than 20% or less that 10% or less than 5%.

The data processor receives data pertaining to the flow and COD and calculated the split of the inlet follow between the two reactors. This allows keeping both $Q_T$ and Load B generally constants.

Table 1, below summarize the above parameters:

TABLE 1

| Remarks | Data Source | Parameter |
|---|---|---|
| May fluctuate highly | Analysis (online or offline) | $P_{in}$ |
| May fluctuate slightly | Analysis (online or offline) | $P_A$ |
| Auto controlled | Online flow meter | $Q_A$ |
| Auto controlled | Online flow meter | $Q_B$ |
| Constant (according with production needs) | Online flow meter | $Q_T$ |
| $P_{in} \times Q_A$ | Calculated | Load A |
| $P_A \times Q_{AB}$ | Calculated | Load AB |
| Calculated or predetermined | Constant setup parameter | Load B |

When the load is expressed in terms of COD, the determination of COD levels is preferably performed by collecting a sample from the respective reactor or fluid communication line and measuring the COD mass per wastewater volume off line. When the load is expressed in terms of TOC, the determination of load can be performed on line, using a TOC measuring device (e.g., TOC Analyzer) as known in the art.

Table 2, below describes an embodiment in which a system is adjusted to an inlet with fluctuated COD, while the total flow is constant and the COD load on B is also constant. In an extreme situation, e.g., when COD in is very low (in the example below 750 mg/l) the entire stream is directed to B. In the opposite extreme situation, namely when the COD in is very high (2500 mg/l in the example below) the entire stream is directed to A. When 750<COD<2500 $Q_A$ and $Q_B$ are adjusted to keep load B constant at 150 Kg/hr.

TABLE 2

| Total Load Into B | Total flow | Inlet flow to B | Inlet Flow to A | COD Inlet | |
|---|---|---|---|---|---|
| 150 KG | 200 m³/h | 0 m³/h | 200 m³/h | 2500 mg/lit | High COD |
| 150 KG | 200 m³/h | 57 m³/h | 143 m³/h | 1500 mg/lit | Medium COD |
| 150 KG | 200 m³/h | 200 m³/h | 0 m³/h | 750 mg/lit | Low COD |

Total degradation in A assumed at 70%

The volume of the reactors can be selected based on several parameters, such as, but not limited to, the required retention time for a given effluent that flow into the to bioreactor system. When working in a sequential mode, this retention time, is divided between the two reactors.

The ratio $V_A/V_B$ between the volume $V_A$ of reactor A and the volume $V_B$ of reactor B is denoted X.

The inlet effluent may fluctuate. These fluctuations can be described in terms of the ratio between maximum and frequent (normal) inlet contamination. For example: COD max/COD normal.

The contamination may be measured by, for example, COD/TOC, ammonia etc. of the inlet. In various exemplary embodiments of the invention X is lower then or equals 1 when the expected fluctuations are below a predetermined threshold Z, and X is above 1 when the expected fluctuations equals or exceed the predetermined threshold Z. When the expected fluctuations exceed a second predetermined threshold Y (Y>Z) then the volume $V_B$ of reactor B is set to a predetermined minimum volume. Thus, in some embodiments of the present invention the volumes of reactors A and B are selected such that the ratio X is a function of the ratio COD max/COD normal.

For example if the inlet COD fluctuations is expected at 50%, both reactors can have the same volume. On the other hand, if the inlet COD fluctuations are expect to be above 50% (e.g., 100% or more), then the volume of B is preferably smaller than the volume of A. These cases are schematically illustrated in FIG. 4A (low fluctuations) and FIG. 4B (high fluctuations).

The relation between X and the expected inlet fluctuations can be expressed graphically. A representative example of a graph suitable to some embodiments of the present invention is illustrated in FIG. 5.

The calculations of the expected fluctuations can be performed based on the total to load or based on the biodegradable load as further detailed hereinabove.

Several additional considerations are envisaged according to some embodiments of the present invention.

If desired the degradation of COD can be maximized in the first reactor instead of in the second reactor. In these embodiments, the process can be adjusted by optimizing the performance of the first reactor. These embodiments are applicable when COD fluctuations are about 50% and in order to maximize the contribution of the first reactor (e.g., the ACT reactor) it is desired to keep its inlet flow constant. The advantage of these embodiments is that high degradation in the ACT reactor minimizes sludge yield and also reduce the majority of the COD load. Another advantage is that the second reactor can serve as a polish process. An additional advantage is that a post treatment process (e.g., filters or the like) can be utilized after the second reactor.

The constant value of $COD\_L_B$ is optionally and preferably set to a level selected so as to control the parameter of interest. For example, to optimize the total COD degradation, $COD\_L_B$ can be kept above a predetermined threshold, or as high as possible, to optimize the global sludge yield $COD\_L_B$ can be kept below a predetermined threshold of as low as possible, and to optimize it for high fluctuation vs. lower fluctuations $COD\_L_B$ is selected accordingly.

The tolerance around the constant level of $COD\_L_B$ affects the tolerances of the output. Thus, in various exemplary embodiments of the invention the tolerance of $COD\_L_B$ is a function of the allowed tolerance of the output quality

Example 2

Experimental Data

Figure 6A:
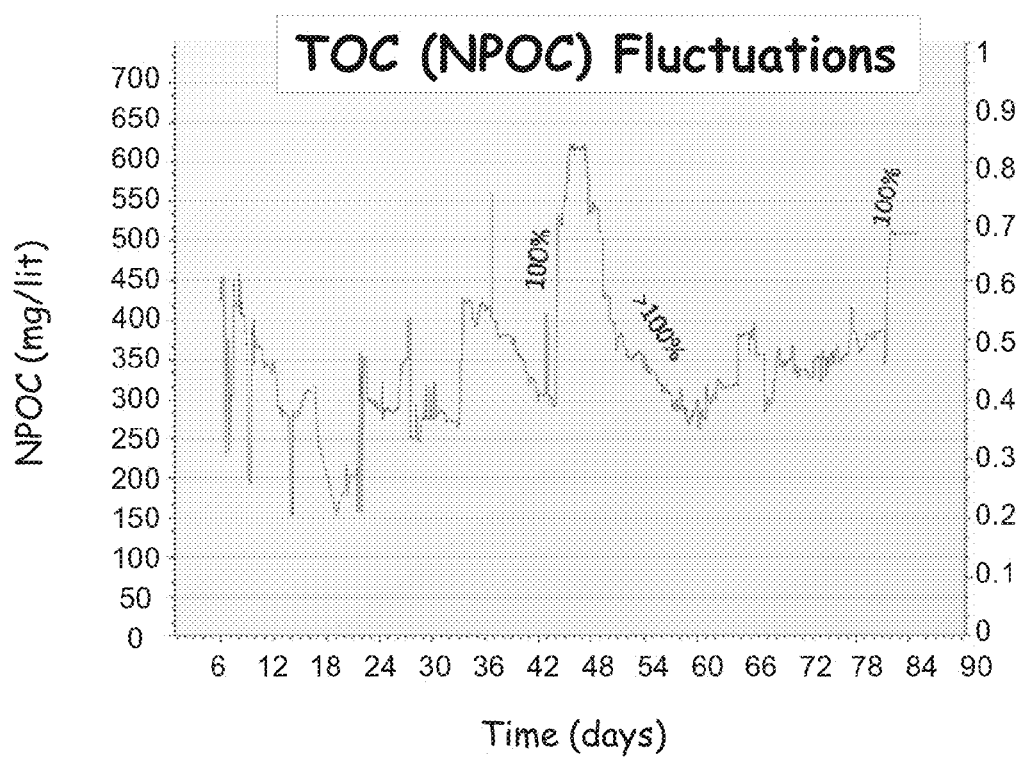
FIGS. 6A-C show experimental data obtained when an ACT system was fed with highly fluctuated waste-water.
Figure 6B:
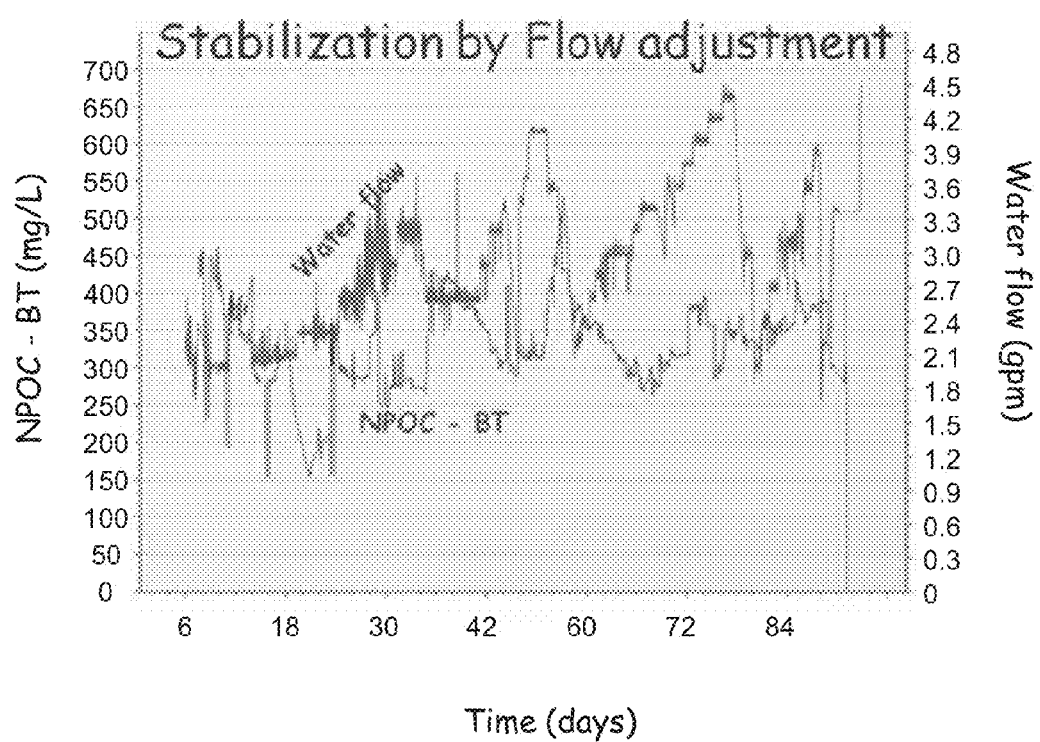
Figure 6C:
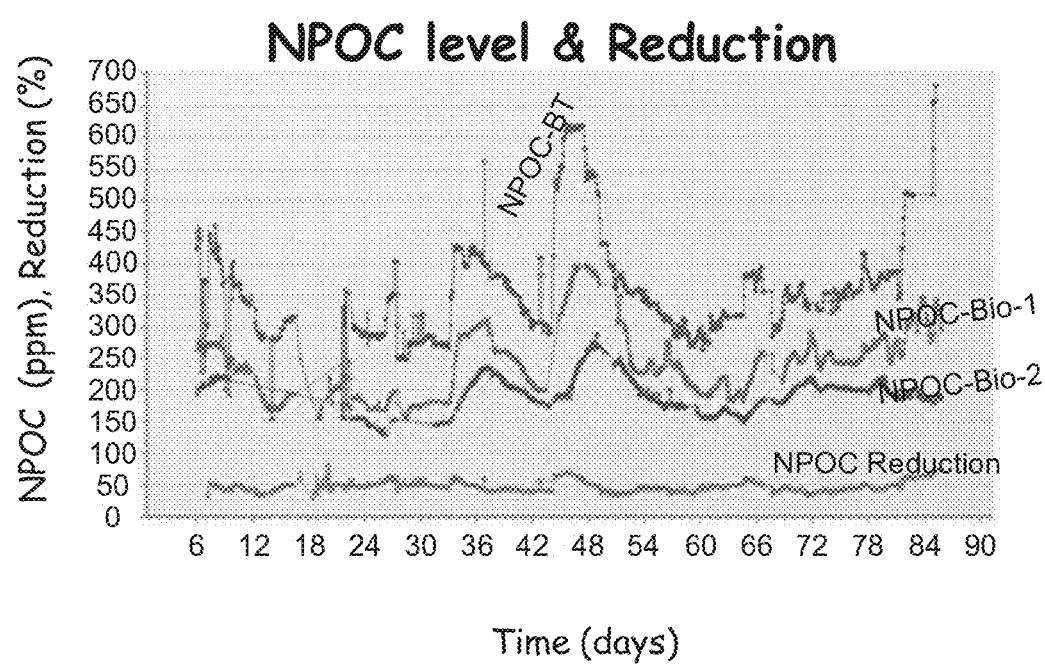

Demonstration of ACT response to organic shock loads is presented in FIGS. 6A-C which describe data from pilot in which the ACT system was fed with highly fluctuated waste-water. By flow control, the ACT was stabilized particular as compared to the inlet fluctuations rate and biological systems.

FIG. 6A shows the change of NPOC (TOC) levels in the inlet. The NPOC levels in the inlet showed considerable frequency and extent of fluctuations. As shown in FIG. 6A in some occasions the levels were doubled or significantly lowered, at a relatively short time span.

FIG. 6B shows changes of the water total flow. The water total flow was controlled by the control unit. During the experiment, the flow ranged between 2 gallons per unit to 4.4 gallons per unit.

FIG. 6C demonstrates the stability of the biological system performances under intensive fluctuated conditions. The NPOC level of the inlet fluctuated between 150 mg/l to 650 mg/l with an average of 375±146 mg/l. Regardless of the high fluctuations rate, the biodegradation rate remained stable at a level of 50% and was decreased to an average level of 172±7 mg/l. The bioprocess was kept stable during the pilot period due to the control system that contains an algorithm that automatically responds to multiple parameters that were measured and calculated automatically. During the pilot, Bioreactor 1 and Bioreactor 2 were worked in a sequential mode, where wastewater that flow out of Bioreactor 1 was directed to Bioreactor 2.

Following is a description of trials performed at a beta site in which a standard mode of activated sludge system was upgraded according to some embodiments of the present invention to a sequential mode by installing an ACT bioreactor upstream to the activated sludge system.

Figure 7A:
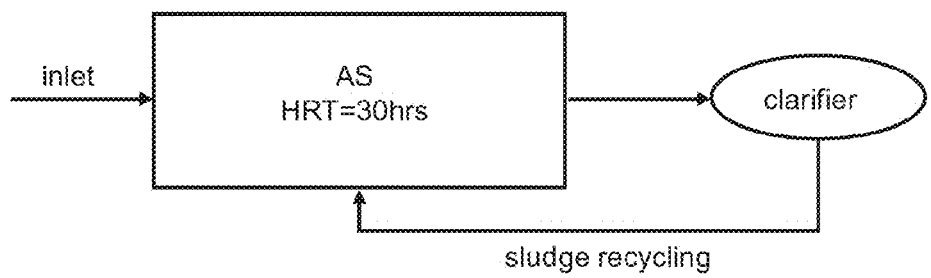
FIGS. 7A-B are schematic illustration of two wastewater system employed during experiments performed according to some embodiments of the present invention.
Figure 7B:
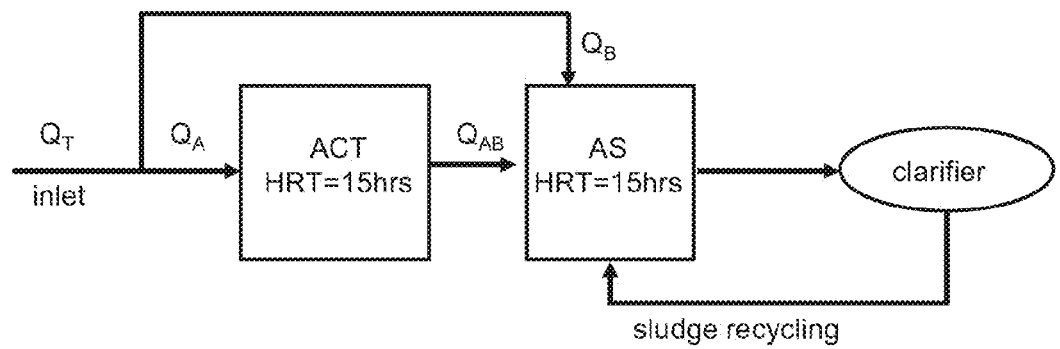

The standard mode with a single AS reactor operated in hydraulic retention time (HRT) of 30 hours is illustrated in FIG. 7A, and the sequential/parallel mode with an ACT reactor operated in HRT of 15 hours serially connected to an AS reactor operated at HRT of 15 hrs (total HRT of 30 hours) is illustrated in FIG. 7B.

Figure 8A:
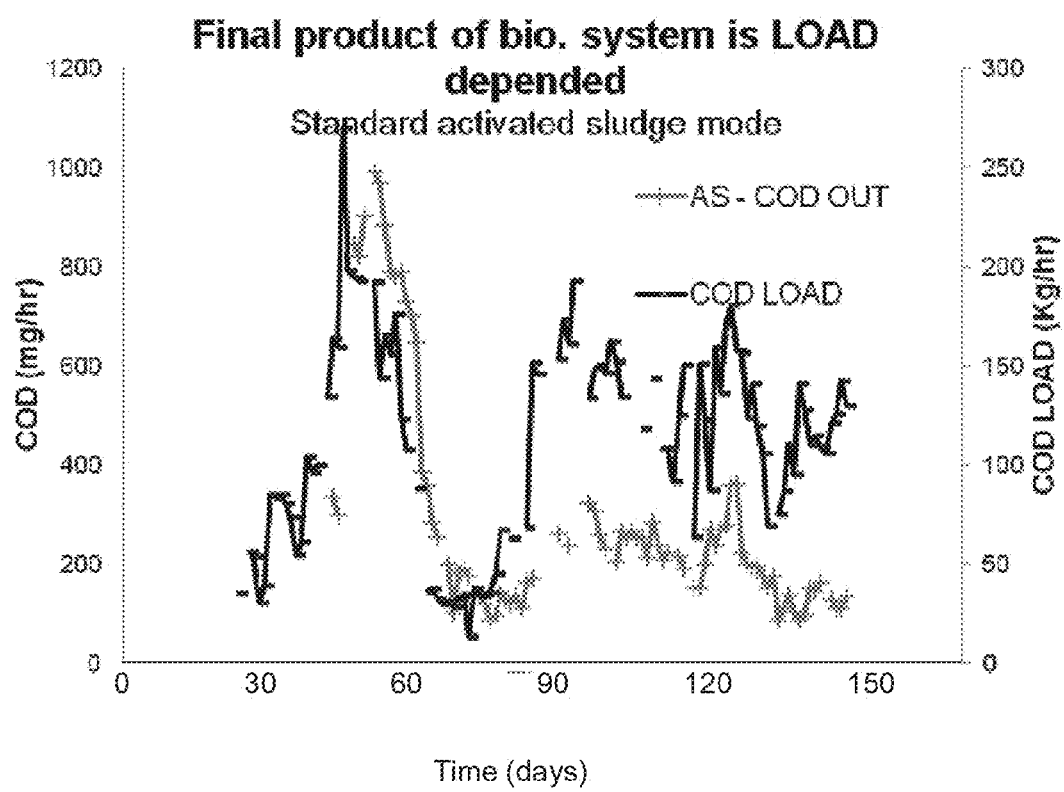
FIGS. 8A and 8B show COD and COD load fluctuations (FIG. 8A) and water flow (FIG. 8B) as obtained from measurement performed during the operation of the system illustrated shown in FIG. 7A.
Figure 8B:
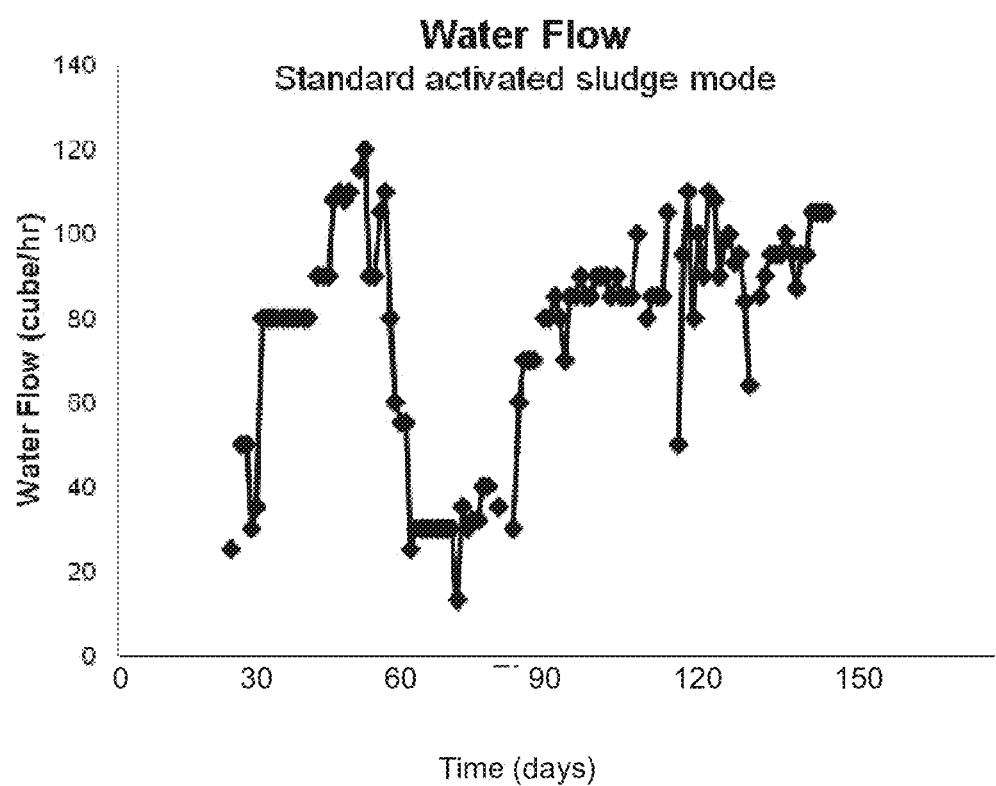

FIGS. 8A and 8B show the COD and COD load fluctuations (FIG. 8A) and water flow (FIG. 8B) during the operation in standard mode. The activated sludge treatment, as measured by COD, is affected by the system load. When load into the system is increased, the COD outlet (COD OUT) is increases accordingly. As a result the water quality is damaged and not meets the desired value. During the time that is presented in FIG. 8B, flow was slow down or stopped in order to mitigate the effect of the increasing load, and yet the flow adjustment did not result in sufficient high quality water.

Figure 9A:
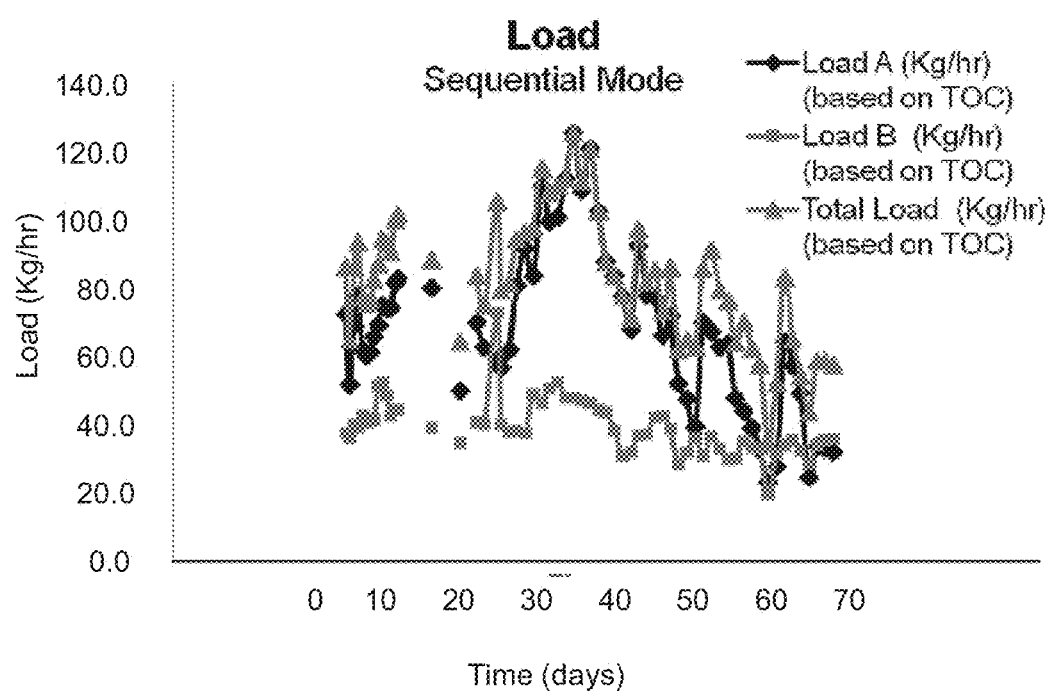
FIGS. 9A and 9B show organic loads (FIG. 9A) and total water flow (FIG. 9B) as obtained from measurement performed during the operation of the system illustrated shown in FIG. 7B in accordance with some embodiments of the present invention.
Figure 9B:
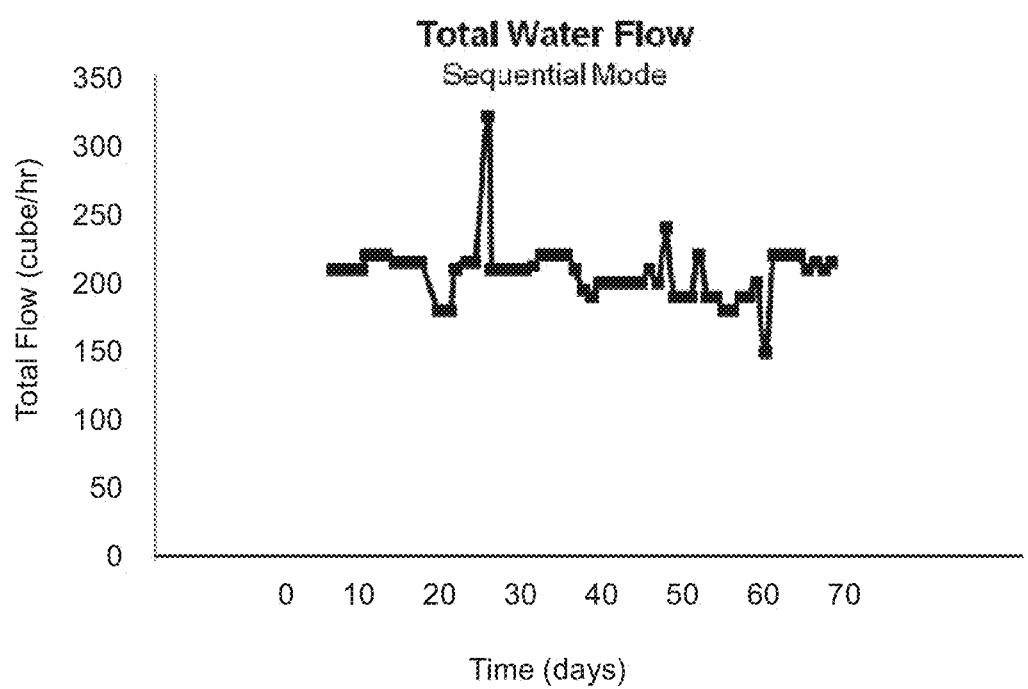

FIGS. 9A and 9B show the loads (FIG. 9A) and total water flow (FIG. 9B) during the operation in sequential/parallel mode according to some embodiments of the present invention. The loads were measured based on TOC.

The following parameters were defined:

$P_{in}$=TOC level at the main inlet;

$P_A$=TOC at the output of the ACT reactor;

Load $A = P_{in} \times Q_A$;

Load $B = P_{in} \times Q_B + P_A \times Q_{AB}$;

Total Load $= P_{in} \times Q_T$;

where, $Q_T$, $Q_A$, $Q_B$ and $Q_{AB}$, are flow rates as defined in Example 1 above and illustrated in FIG. 7B.

While total load and Load A was fluctuated, due to the nature of the fluctuations in the plant, the load on B was kept generally constant. Note that the total flow was not adjusted and remain high and constant (see FIG. 9B).

Figure 10:
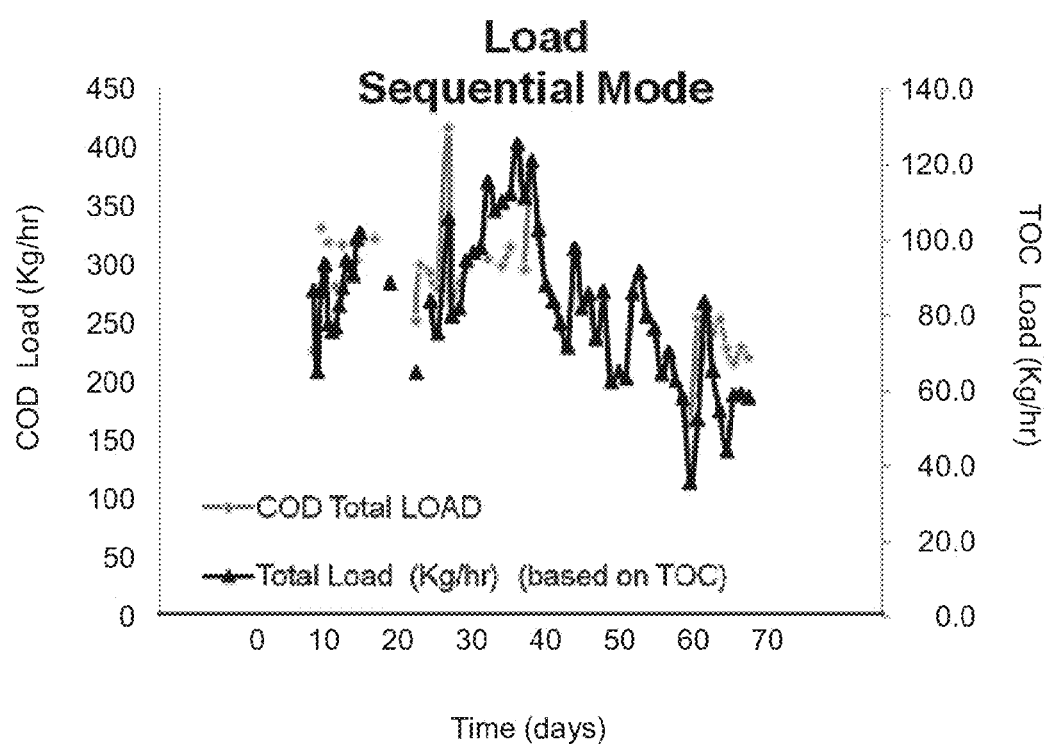
FIG. 10 shown compares loads as calculated based on COD as measured off line and based on TOC as measured on-line during the operation of the system illustrated shown in FIG. 7B in accordance with some embodiments of the present invention.

FIG. 10 compares the loads as calculated based on COD as measured off-line and based on TOC as measured on-line during the operation in sequential mode. As shown, the two parameters correlate to each other.

Figure 11:
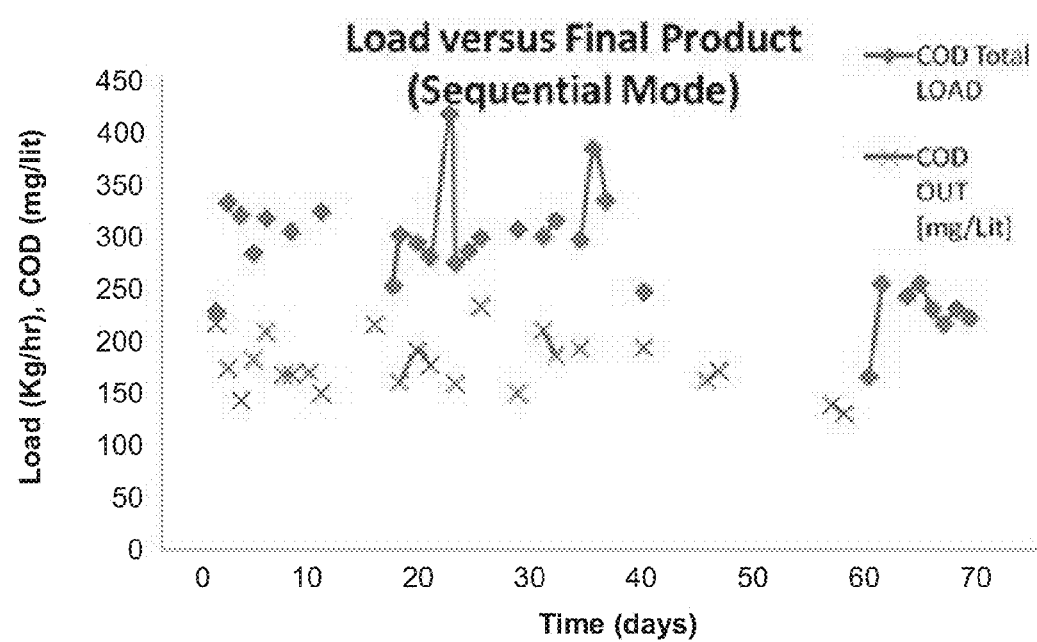
FIG. 11 compares the total COD load and the COD outlet during the operation of the system illustrated shown in FIG. 7B in accordance with some embodiments of the present invention.

FIG. 11 compares the total COD load and the COD outlet during the operation in sequential mode. As shown, the water is with high quality (measured by COD), and more stable even though the inlet fluctuated. This was achieved by keeping the load on the AS bioreactor constant, and without reducing the total flow.

Table 3 below summarizes the average COD load and average COD outlet during the two operation modes.

TABLE 3

| Average COD OUT mg/lit | Average COD LOAD Kg/hr | Units |
|---|---|---|
| 290.9 | 219.8 | Standard activated sludge |
| 173.7 | 276.9 | Sequential Mode |

Although the Average COD Load during the sequential mode was about 25% higher than the load in the Standard activated sludge, the performances of the sequential mode was better. The average COD out was 173 mg/l in the sequential mode, and 290 mg/l in the standard mode. The enhanced performance of the sequential mode was achieved while flow was high and constant. This is in contrast to the standard mode wherein the flow was reduced to adjust the system to the increasing load.

The present experimental data demonstrate the ability of the technique of the to present embodiments to maintain generally constant load on the reactor substantially without changing the flow rate with the main influent.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of treating wastewater in a wastewater treatment system receiving an influent of the wastewater via a wastewater inlet and having at least a first Automated Chemostat Treatment (ACT) bioreactor and a second bioreactor each having therein bacteria for treating the waste material, the method comprising:
monitoring a load parameter being indicative of a load on said second bioreactor;
responsively to a monitored value of said load parameter, controlling at least one flow rate selected from the group consisting of (i) a flow rate from the influent to said second bioreactor through said first bioreactor, and (ii) a flow rate from the influent directly to said second bioreactor, so as to maintain a generally constant and predetermined load on said second bioreactor;
wherein said bioreactors are in fluid communication with the inlet and thereamongst.

2. A wastewater treatment system, comprising:
a wastewater inlet for receiving an influent of wastewater;
at least a first Automated Chemostat Treatment (ACT) bioreactor and a second bioreactor each having therein bacteria for treating the wastewater, said bioreactors being in fluid communication with said inlet and thereamongst;
a monitoring unit configured for monitoring a load parameter being indicative of a load on said second bioreactor; and
a controller configured for controlling, responsively to a monitored value of said load parameter, at least one flow rate selected from the group consisting of (i) a flow rate from the influent to said second bioreactor through said first bioreactor, and (ii) a flow rate from the influent directly to said second bioreactor, so as to maintain a generally constant and predetermined load on said second bioreactor.

3. The method according to claim 1, wherein said second bioreactor is selected from the group consisting of: an ACT, a sequential batch reactor, a membrane bioreactor, an activated sludge reactor and a moving bed bioreactor.

4. A method of treating a waste material in a waste material treatment system receiving an influent of the waste material via a waste material inlet and having at least a first bioreactor and a second bioreactor each having therein bacteria for treating the waste material, the method comprising:
monitoring a load parameter at least in the influent; and
responsively to a monitored value of said load parameter, controlling at least one flow rate selected from the group consisting of (i) a flow rate from the influent to said second bioreactor through said first bioreactor, and (ii) a flow rate from the influent directly to said second bioreactor;
wherein said bioreactors are in fluid communication with the inlet and thereamongst.

5. A waste material treatment system, comprising:
a waste material inlet for receiving an influent of waste material;
at least a first bioreactor and a second bioreactor each having therein bacteria for treating the waste material, said bioreactors being in fluid communication with said inlet and thereamongst;
a monitoring unit configured for monitoring a load parameter at least in the influent; and
a controller configured for controlling, responsively to a monitored value of said load parameter, at least one flow rate selected from the group consisting of (i) a flow rate from the influent to said second bioreactor through said first bioreactor, and (ii) a flow rate from the influent directly to said second bioreactor.

6. The method according to claim 1, wherein said controlling of said flow rates is performed without changing the flow rate in the influent.

7. The method according to claim 4, wherein if said monitored value is outside a predetermined range, then the flow rate from the influent directly to said second bioreactor is reduced.

8. The method according to claim 4, wherein said controlling of said flow rates is performed so as to maintain a generally constant and predetermined waste material load in said second bioreactor.

9. The method according to claim 4, wherein said controlling of said flow rates is performed so as to maintain a generally constant and predetermined waste material load in said first bioreactor.

10. The method according to claim 1, wherein said generally constant and predetermined waste material load is selected such as to maintain a total degradation of at least one parameter selected from the group consisting of Chemical Oxygen Demand and Total Organic Carbon which is below a predetermined threshold.

11. The method according to claim 1, wherein said generally constant and predetermined waste material load is selected such as to maintain a global sludge yield which is below a predetermined threshold.

12. The method according to claim 1, wherein at least one of said first bioreactor and said second bioreactor is at aerobic conditions.

13. The method according to claim 1, wherein at least one of said first bioreactor and said second bioreactor is at anaerobic conditions.

14. The method according to claim 1, wherein said monitoring is performed on-line.

15. The method according to claim 1, wherein said monitoring is performed off-line.

16. The method according to claim 4, wherein each of said first and said second bioreactors is independently selected from the group consisting of: an automated chemostat, a sequential batch reactor, a membrane bioreactor, an activated sludge reactor and a moving bed bioreactor.

17. The method according to claim 4, wherein said first bioreactor is an automated chemostat.

18. The method according to claim 4, wherein said first bioreactor is other than an automated chemostat.

19. The method according to claim 1, wherein said load parameter is calculated based on a waste material load in the influent and a waste material load on said second bioreactor as measured from data collected from a flow of waste material directed from said first to said second bioreactor.

20. The method according to claim 19, wherein said load parameter is a linear combination of said waste material loads.

21. The method according to claim 19, wherein said waste material load on said second bioreactor is indicative of the biodegradable capability of said second bioreactor.

22. The method according to claim 21, wherein said waste material load on said second bioreactor is calculated using statistical analysis applied on historical data collected from the second bioreactor.

23. The method according to claim 19, wherein each of said waste material loads is independently calculated using at least one monitored parameter selected from the group consisting of at least one parameter selected from the group consisting of chemical oxygen demand (COD), dissolved oxygen (DO), oxygen uptake rate (OUR), pH, temperature, total petroleum hydrocarbons (TPH), biochemical oxygen demand (BOD), total organic carbon (TOC), non-purgable organic carbon (NPOC), total suspended solids (TSS), turbidity, conductivity, chloride concentration, salinity, total nitrogen, ammonia, ammonium, nitrite, nitrate, $N_2$, total phosphate, $PO_4$ (orthophosphate), oxidised & ortho phosphorus (OOP), poly-phosphates, sulfide, sulfate, phenol, MTBE, detergent, poly aromatic hydrocarbons (PAH), cresol, detergents, volatile suspended solids (VSS), $CO_2$ (air and/or water), cyanide, total carbon (TC), total inorganic carbon (TIC), oil and grease, optical absorbance, and any combination thereof.

24. The method according to claim 4, wherein said waste material is wastewater.

25. The method according to claim 1, wherein the inlet is characterized by average content fluctuations of less than Z % wherein Z<100 and wherein a volume of said first bioreactor is not larger than a volume of said second bioreactor.

26. The method according to claim 1, wherein the inlet is characterized by average content fluctuations of more than Z % wherein Z<100 and wherein a volume of said first bioreactor is larger than a volume of said second bioreactor.

27. A method of improving a waste material treatment system receiving an influent of the waste material into a bioreactor B, comprising
- obtaining expected content fluctuations of waste material in the influent;
- providing a bioreactor A wherein a volume of said first bioreactor A is larger than a volume of said bioreactor B if and only if said expected content fluctuations is above Z %, wherein Z<100;
- deploying said bioreactor A such as to establish a controllable fluid communication between said bioreactor A and the influent, a controllable fluid communication between said bioreactor B and the influent, and a fluid communication from said bioreactor A to said bioreactor B;
- positioning a monitoring unit configured for monitoring a load parameter at least in the influent; and
- positioning a controller configured for controlling, responsively to a monitored value of said load parameter, flow rates (i) from the influent to said second bioreactor through said first bioreactor, and (ii) from the influent directly to said second bioreactor.

* * * * *